United States Patent
Yuan et al.

(10) Patent No.: US 8,138,808 B2
(45) Date of Patent: Mar. 20, 2012

(54) CIRCUIT FOR DETECTING PHASE IMBALANCE OF SIGNALS

(75) Inventors: Yongbin Yuan, Shanghai (CN); Jundong Zhu, Shanghai (CN); Jingwei Zhang, Shanghai (CN)

(73) Assignee: O2micro, Inc, Santa Clara, CA (US)

( * ) Notice: Subject to any disclaimer, the term of this patent is extended or adjusted under 35 U.S.C. 154(b) by 11 days.

(21) Appl. No.: 12/690,570

(22) Filed: Jan. 20, 2010

(65) Prior Publication Data

US 2011/0133784 A1 Jun. 9, 2011

(30) Foreign Application Priority Data

Dec. 3, 2009 (CN) .......................... 2009 1 0251373

(51) Int. Cl.
*H03L 7/06* (2006.01)
(52) U.S. Cl. ........................................................ 327/158
(58) Field of Classification Search .................. 327/300, 327/158
See application file for complete search history.

(56) References Cited

U.S. PATENT DOCUMENTS 4,920,278 A * 4/1990 Nawata .............................. 327/3
7,298,191 B2 * 11/2007 Wu et al. ....................... 327/158

* cited by examiner

*Primary Examiner* — Lincoln Donovan
*Assistant Examiner* — Daniel Rojas

(57) ABSTRACT

A circuit for detecting a phase imbalance of signals includes a conversion block and a comparator coupled to the conversion block. The conversion block generates generating a direct current (DC) signal based on a first signal and a second signal. The level of the DC signal is determined by a phase difference between the first signal and the second signal. The comparator compares the DC signal to a reference signal and generates an alert signal if a difference between the DC signal and the reference signal is greater than a predetermined threshold.

13 Claims, 4 Drawing Sheets

CIRCUIT FOR DETECTING PHASE IMBALANCE OF SIGNALS

RELATED APPLICATION

This application claims priority to Chinese Patent Application No. 200910251373.5, titled Circuit for Detecting Phase Imbalance of Signals, filed on Dec. 3, 2009, which is hereby incorporated by reference in its entirety.

BACKGROUND

In a radio system, a receiver is usually used to demodulate a radio frequency (RF) signal that is received by an antenna and to generate a demodulated signal. The RF signal can be transmitted in the receiver by an in-phase channel and a quadrature-phase channel. However, the two channels may suffer from a phase imbalance, that is, a phase difference between the in-phase channel and the quadrature-phase channel may be relatively large. As a result, the demodulated signal output by the receiver may be distorted.

A detection scheme can be employed to detect the phase imbalance in the receiver. One of the detection schemes is to determine if the phase imbalance occurs based on the maximum likelihood criterion. However, such detection scheme may employ relatively complex computation.

Furthermore, a compensation circuit can be employed to adjust/compensate the phase imbalance. A conventional compensation circuit employs a voltage-controlled oscillator (VCO) or a voltage-controlled low pass filter (VCLPF) to continuously adjust the phase imbalance, and thus may result in relatively high power consumption. Furthermore, the VCO or the VCLPF consumes additional area, and thus the cost of such conventional compensation circuit may be increased.

SUMMARY

In one embodiment, a circuit for detecting a phase imbalance of signals includes a conversion block and a comparator coupled to the conversion block. The conversion block generates a direct current (DC) signal based on a first signal and a second signal. The level of the DC signal is determined by a phase difference between the first signal and the second signal. The comparator compares the DC signal to a reference signal and generates an alert signal if a difference between the DC signal and the reference signal is greater than a predetermined threshold.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
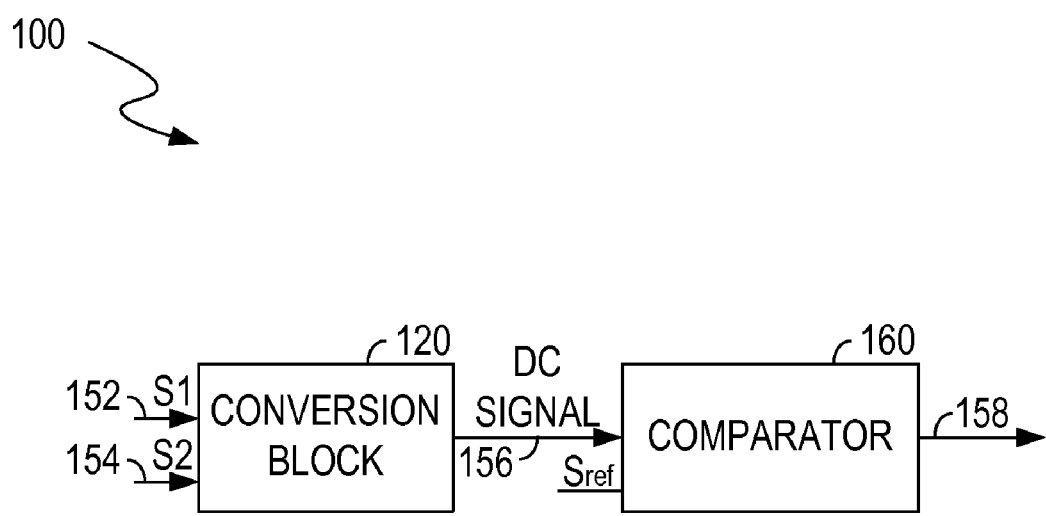
FIG. 1 shows a circuit for detecting a phase imbalance according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "generating," "comparing," "adjusting," "controlling," "providing," "reducing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a detection circuit for detecting a phase imbalance among multiple signals. In one embodiment, the detection circuit can detect the phase imbalance between a first signal and a second signal. A conversion block in the detection circuit can generate a DC signal indicating a phase difference between the first signal and the second signal. A comparator in the detection circuit compares the DC signal to a reference signal and generates an alert signal if a difference between the DC signal and the reference signal is greater than a predetermined threshold. Moreover, the alert signal can be used to adjust the phase of the first and/or the second signal to reduce the phase difference between the first and second signals in order to reduce or avoid the phase imbalance. For illustrative purposes, the invention is described in the context of detecting phase imbalance between two signals. However, the invention is not so limited; it can be also used to detect a phase imbalance among three or more signals.

FIG. 1 shows a circuit 100 for detecting a phase imbalance according to one embodiment of the present invention. In the example of FIG. 1, the circuit 100 includes a conversion block 120 and a comparator 160. The circuit 100 receives a first signal 152 and a second signal 154, in one embodiment. The circuit 100 can detect an undesired condition, e.g., a phase imbalance between the signals 152 and 154. The phase imbalance means that a phase difference between a first and a second signal, e.g., signals 152 and 156, exceeds a predetermined threshold, in one embodiment. The circuit 100 can generate an alert signal 158 if the phase imbalance is detected. In one embodiment, the alert signal 158 can be used to reduce the phase difference between the signals 152 and 154, and thus to reduce or eliminate the phase imbalance between the signals 152 and 154.

The conversion block 120 generates a DC signal 156 based on the first signal 152 and the second signal 154, in one embodiment. Advantageously, the level of the DC signal 156 is determined by the phase difference between the signals 152 and 154. Thus, the DC signal 156 can indicate the phase difference between the signals 152 and 154 that are input into the circuit 100.

The comparator 160 coupled to the conversion block 120 compares the DC signal 156 to a reference signal $S_{ref}$. In one embodiment, the comparator 160 generates the alert signal 158 if a difference between the DC signal 156 and the reference signal $S_{ref}$ is greater than a predetermined threshold. Thus, the alert signal 158 can indicate a phase imbalance between the signals 152 and 154. Furthermore, the alert signal 158 can be used to adjust a phase of the first signal 152 and/or the second signal 154 to reduce the phase difference therebetween, in one embodiment.

In the example of FIG. 1, one comparator is employed to compare the DC signal 156 to one reference signal $S_{ref}$. In another embodiment, two comparators can be employed, wherein a first comparator compares the DC signal 156 to a first reference signal $S_{ref\_U}$ and a second comparator compares the DC signal 156 to a second reference signal $S_{ref\_L}$, which will be described in relation to FIG. 2.

Figure 2:
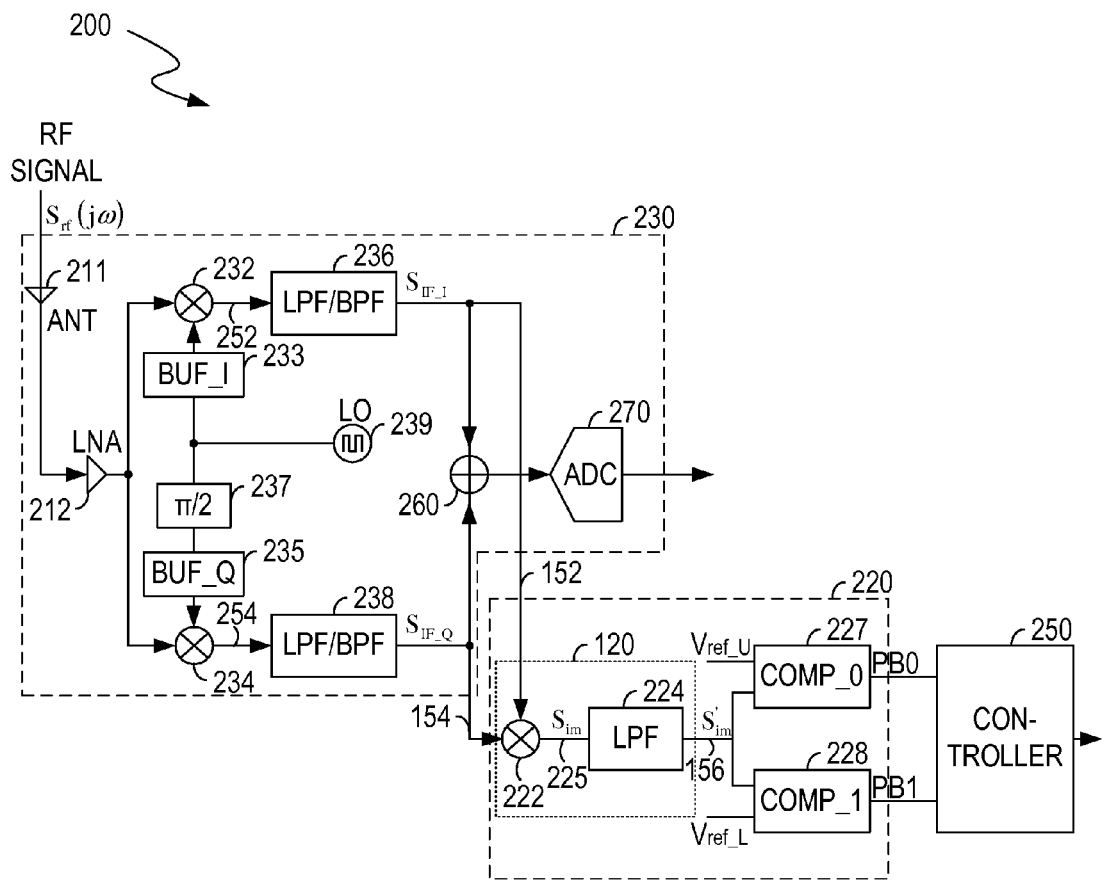
FIG. 2 shows a signal transfer system according to one embodiment of the present invention.

FIG. 2 shows a signal transfer system 200 according to one embodiment of the present invention. Elements labeled the same as in FIG. 1 have similar functions. In the example of FIG. 2, the signal transfer system 200 includes a signal transfer circuit, a detection circuit 220, and a controller 250. In one embodiment, the signal transfer circuit includes a receiver 230.

A signal, e.g., a radio frequency (RF) signal, input into the receiver 230 can be transmitted by the channels in the receiver 230. A first channel, e.g., an in-phase channel, receives the RF signal and outputs a first signal 152 to the detection circuit 220. A second channel, e.g., a quadrature-phase channel, receives the RF signal and outputs a second signal 154 to the detection circuit 220.

Advantageously, the detection circuit 220 can sense a phase difference between the first signal 152 and the second signal 154 and can detect a phase imbalance in the receiver 230, for example, phase imbalance between the in-phase channel and the quadrature-phase channel. The detection circuit 220 generates an alert signal if the phase imbalance is detected, in one embodiment. Moreover, the controller 250 coupled to the detection circuit 220 compensates the phase imbalance according to the alert signal. The controller 250 can control the receiver 230 to reduce the phase difference between the in-phase channel and the quadrature-phase channel.

In the example of FIG. 2, the receiver 230 includes an antenna 211, an amplifier such as a low noise amplifier (LNA) 212, frequency mixers 2232 and 234, filters such as low pass filters (LPF) or band pass filters (BPF) 236 and 238, buffers 233 and 235, a phase shifter 237, a local oscillator (LO) 239, an adder 260, and an analog-to-digital converter (ADC) 270. The in-phase channel includes the frequency mixer 232 and the filter 236. Similarly, the quadrature-phase channel includes the frequency mixer 234 and the filter 238.

The RF signal received by the antenna 211 passes through the amplifier 212 and is input into the frequency mixer 232 of the in-phase channel. A frequency signal from the oscillator 239 passes through the buffer 233 and is also input into the frequency mixer 232. Upon receiving the signals from the amplifier 212 and the buffer 233, the frequency mixer 232 generates an output signal 252 to the filter 236. In one embodiment, the frequency of the signal 252 is less than the frequency of the RF signal. The filter 236 smoothes the signal 252 and outputs the first signal 152 to the frequency mixer 222 in the detection circuit 220.

Similarly, the RF signal passes through the amplifier 212 and is input into the frequency mixer 234 of the quadrature-phase channel. A frequency signal from the oscillator 239 passes through the phase shifter 237 to the buffer 235. The phase shifter 237 can determine a phase shift, e.g., a 90 degree phase shift. Thus, the phase of the frequency signal from the oscillator 239 can be shifted by 90 degree, in one embodiment. The phase-shifted frequency signal passes through the buffer 235 and is further input into the frequency mixer 234. Upon receiving the signals from the amplifier 212 and the buffer 235, the frequency mixer 234 generates an output signal 254 to the filter 238. In one embodiment, the frequency of the signal 254 is less than the frequency of the RF signal. The filter 238 smoothes the signal 254 and outputs the second signal 154 to the frequency mixer 222 in the detection circuit 220.

The adder 260 generates an analog signal that is the superposition of the first signal 152 and the second signal 154 and provides the analog signal to the analog-to-digital converter 270. The analog-to-digital converter 270 converts the analog signal into a digital signal which can be provided to a processor (not shown in FIG. 2). The processor can process the digital signal for various signal processing purposes.

An example for operation of the receiver 230 is described here. Assume that the RF signal is a sinusoidal signal $S_{rf}(j\omega) = \sin(j\omega_{rf})$, the transfer function $H_I(j\omega)$ of the in-phase channel is $A\cos(j\omega_c + \theta/2)$, and the transfer function $H_Q(j\omega)$ of the quadrature-phase channel is $A\sin(j\omega_c - \theta/2)$. For illustrative purposes, an amplitude imbalance between the in-phase channel and the quadrature-phase channel is ignored. Therefore, the output signal 252 from the frequency mixer 232 and the output signal 254 from the frequency mixer 234 can be given by equations (1) and (2) as follows, respectively:

$$S_{252} = S_{rf}(j\omega) * H_I(j\omega) \quad (1)$$
$$= \frac{A}{2}\sin\left(j(\omega_{rf} + \omega_c) + \frac{\theta}{2}\right) + \frac{A}{2}\sin\left(j(\omega_{rf} - \omega_c) - \frac{\theta}{2}\right)$$

$$S_{254} = S_{rf}(j\omega) * H_Q(j\omega) \quad (2)$$
$$= -\frac{A}{2}\cos\left(j(\omega_{rf} + \omega_c) - \frac{\theta}{2}\right) + \frac{A}{2}\cos\left(j(\omega_{rf} - \omega_c) + \frac{\theta}{2}\right),$$

where $S_{252}$ represents the output signal 252, $S_{254}$ represents the output signal 254, A is the amplitude of the transfer functions $H_I(j\omega)$ and $H_Q(j\omega)$, $\omega_{rf}$ is the frequency of the RF signal, $\omega_c$ is the frequency of the in-phase channel and the quadrature-phase channel, and $\theta$ is the phase difference between the in-phase channel and the quadrature-phase channel.

Because the high frequency component in equations (1) and (2) can be filtered by the filters 236 and 238, the first signal 152 from the in-phase channel and the second signal 154 from the quadrature-phase channel can be given by equations (3) and (4) as follows, respectively:

$$S_{IF\_I} = \frac{A}{2}\sin\left(j\omega_{if} - \frac{\theta}{2}\right) \quad (3)$$

$$S_{IF\_Q} = \frac{A}{2}\cos\left(j\omega_{if} + \frac{\theta}{2}\right), \quad (4)$$

where $S_{IF\_I}$ represents the first signal 152, $S_{IF\_Q}$ represents the second signal 154, and $\omega_{if} = (\omega_{rf} - \omega_c)$. Therefore, the phase difference between the first signal 152 and the second signal 154 is determined by the phase difference between the in-phase channel and the quadrature-phase channel in the receiver 230.

In the example of FIG. 2, the detection circuit 220 includes a conversion block 120, and comparators 227 and 228. The conversion block 120 includes a frequency mixer 222 and a filter such as a low pass filter (LPF) 224. The frequency mixer 222 receives the first signal 152 and the second signal 154 from the receiver 230 and generates an output signal 225. The signal 225 can be given by equation (5) as follows:

$$S_{im} = S_{IF\_I} * S_{IF\_Q} = \frac{A^2}{8}(\sin(2j\omega_{if}) + \sin\theta). \quad (5)$$

The mixer frequency 222 outputs the signal 225 to the filter 224. According to equation (5), the signal 225 includes a DC signal $$\frac{A^2}{8}\sin\theta$$

and a frequency signal $$\frac{A^2}{8}\sin(2j\omega_{if}).$$

In one embodiment, a frequency of the frequency signal is a summation of a frequency of the first signal 152 and a frequency of the second signal 154. Therefore, a signal 156 output by the filter 224 can be given by equation (6) as follows:

$$S'_{im} = \frac{A^2}{8}\sin\theta. \quad (6)$$

Consequently, in one embodiment, the signal 156 generated by the conversion block 120 is a DC signal, and the level of the signal 156 is determined by the phase difference between the first signal 152 and the second signal 154. In other words, the signal 156 can indicate the phase difference between the in-phase channel and the quadrature-phase channel in the receiver 230.

In the example of FIG. 2, the signal 156 generated by the conversion block 120 is compared to reference signals $V_{ref\_U}$ and $V_{ref\_L}$ for detecting a phase imbalance in the receiver 230. In one embodiment, the detection circuit 220 can generate an alert signal if the phase imbalance is detected.

More specifically, the comparator 227 compares the signal 156 to the reference signal $V_{ref\_U}$ to determine if the phase of the first signal 152 is forward to the phase of the second signal 154. In one embodiment, if the signal 156 is greater than a summation of the reference signal $V_{ref\_U}$ and a predetermined threshold (e.g., the predetermined threshold can be zero or greater than zero), the comparator 227 can determine that the phase of the first signal 152 is forward to the phase of the second signal 154. Thus, the comparator 227 can generate an alert signal PB0, e.g., logic "1", to indicate that a phase imbalance between the signals 152 and 154 occurs. Similarly, the comparator 228 compares the signal 156 to the reference signal $V_{ref\_L}$ to determine if the phase of the first signal 152 is backward to the phase of the second signal 154. In one embodiment, the reference signal $V_{ref\_U}$ is greater than the reference signal $V_{ref\_L}$. In one embodiment, if the signal 156 is less than a summation of the reference signal $V_{ref\_L}$ and a predetermined threshold (e.g., the predetermined threshold can be zero or greater than zero), the comparator 228 can determine that the phase of the first signal 152 is backward to the phase of the second signal 154. Thus, the comparator 228 can generate an alert signal PB1, e.g., logic "1", to indicate that a phase imbalance occurs. Advantageously, the detection circuit 220 employs relatively less computations to detect the phase imbalance and thus the phase imbalance detection can be more efficient.

In the example of FIG. 2, two alert signals are generated by the detection circuit 220. Alternatively, one alert signal which is a two-bit signal can be generated. More specifically, one bit in the two-bit signal indicates the comparison result of the comparator 227 and the other bit indicates the comparison result of the comparator 228.

In one embodiment, the controller 250 in the signal transfer system 200 can control a buffer 233 and/or a buffer 235 in the receiver 230 to reduce the phase difference between the first signal 152 and the second signal 154 (or the phase difference between the in-phase channel and the quadrature-phase channel in the receiver 230) according to the alert signal generated by the detection circuit 220, which will be described in relation to FIG. 3.

Figure 3:
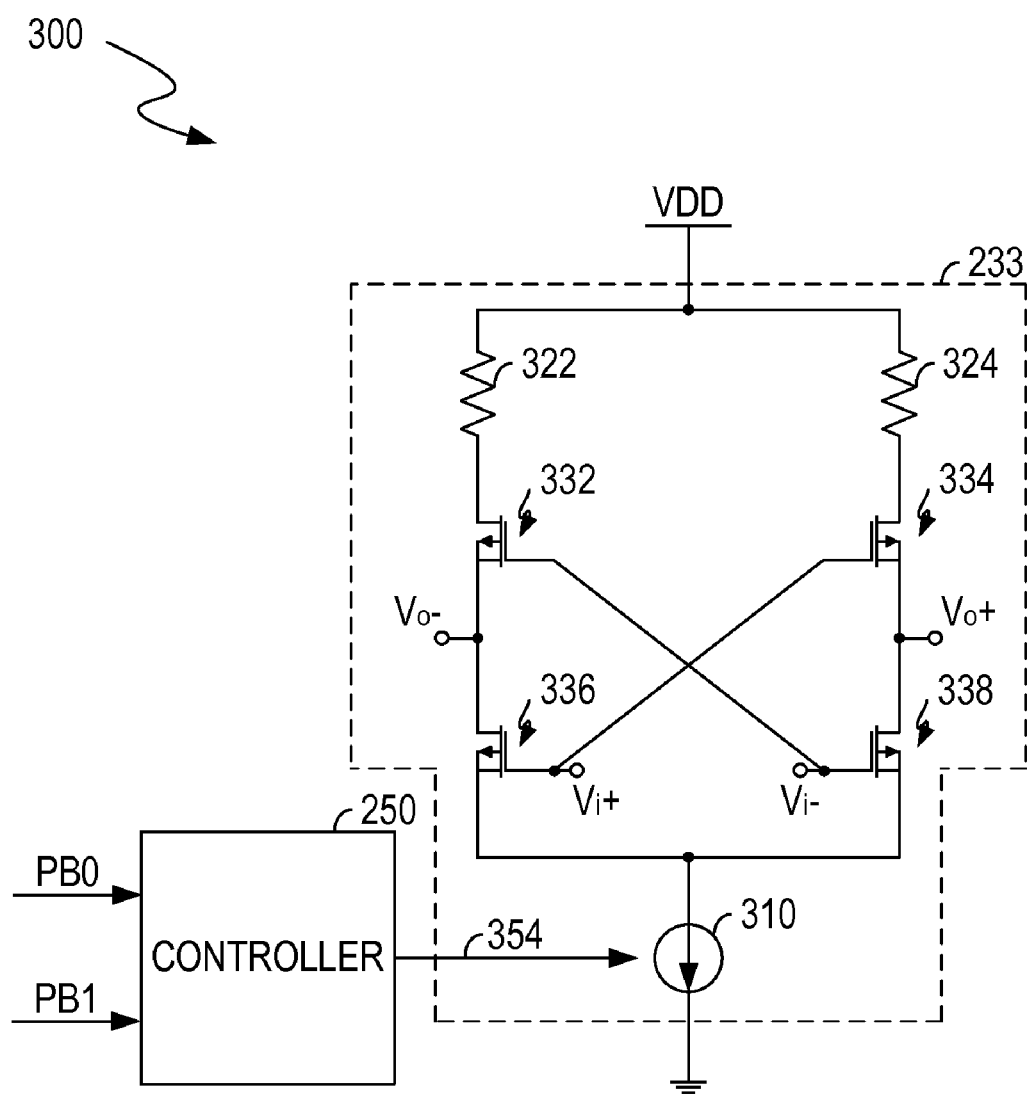
FIG. 3 shows using a controller to reduce a phase difference between signals according to one embodiment of the present invention.

FIG. 3 shows using the controller 250 to reduce the phase difference between the signals or the channels according to one embodiment of the present invention. Elements labeled the same as in FIG. 2 have similar functions. FIG. 3 is described in combination with FIG. 2. In the example of FIG. 3, the controller 250 controls the buffer 233 in the receiver 230.

In the example of FIG. 3, the buffer 233 includes resistors 22 and 324, transistors 332, 334, 336 and 338, and a current source 310. In this embodiment, the buffer 233 is a differential input and differential output circuit. The gate of the transistor 332 is coupled to the gate of the transistor 338. An input voltage Vi− is provided to the common node of the gate of the transistor 332 and the gate of the transistor 338. The source of the transistor 332 is coupled to the drain of the transistor 336. An output voltage Vo− is generated at the node between the source of the transistor 332 and the drain of the transistor 336. Similarly, an input voltage Vi+ is provided to the common node of the gate of the transistor 334 and the gate of the transistor 336. The source of the transistor 334 is coupled to the drain of the transistor 338. An output voltage Vo+ is generated at the node between the source of the transistor 334 and the drain of the transistor 338.

The resistors 322 and 324 couples a power supply voltage VDD to the drain of the transistor 332 and the drain of the transistor 334, respectively. The current source 310 couples the source of the transistor 336 and the source of the transistor 338 to ground. The controller 250 generates a control signal 354 in response to the signals PB0 and PB1 generated by the detection circuit 220 in FIG. 2 and outputs the control signal 354 to control the current source 310 in the buffer 233. Advantageously, a current of the current source 310 can be adjusted according to the control signal 354. In the example of FIG. 2, the current of the current source 310 is configured to adjust the phase of the first signal 152 (of the in-phase channel) so as to reduce or eliminate the phase imbalance.

The output voltage Vo− can be given by equation (7) as follows:

$$V_o^- = H_1(s)^+ * V_I^+ + H_1(s)^- * V_I^-. \quad (7)$$

where $V_o^-$ is the output voltage Vo−, $V_I^+$ is the input voltage Vi+, $V_I^-$ is the input voltage Vi−, $H_1(s)^+$ is transfer function of the transistor 336 and the resistor 322, and $H_1(s)^-$ is transfer function of the transistor 332 and the resistor 322.

The output voltage Vo+ can be given by equation (8) as follows:

$$V_o^+ = H_2(s)^- * V_I^+ + H_2(s)^+ * V_I^-, \quad (8)$$

where $V_o^+$ is the output voltage Vo+, $H_2(s)^+$ is transfer function of the transistor 338 and the resistor 324, and $H_2(s)^-$ is transfer function of the transistor 334 and the resistor 324.

In one embodiment, the transistors 332 and 334 are the same, the transistors 336 and 338 are the same, and the resistors 322 and 324 are the same. In this instance, $H_1(s)^+$ in equation (7) is equal to $H_2(S)^+$ in equation (8), and $H_1(s)^-$ in equation (7) is equal to $H_2(s)^-$ in equation (8). The transfer functions $H_1(s)^+$ and $H_2(s)^+$ in the equations (7) and (8) can be given by equation (9) as follows:

$$H_1(s)^+ = H_2(s)^+ = \frac{V_O^-}{V_I^+} = -gm_{336}R_0 \left( \frac{S - \frac{1}{gm_{336} * C_{gd336}}}{S + \frac{R_0}{C'_{d336}}} \right), \quad (9)$$

where $$R_0 \approx \frac{1}{g_{ds332}} // \left( \frac{1}{g_{ds336}} + R_{322} \right),$$

$C_{d336}' = C_{gd336} // C_{ds336}$, $gm_{336}$ is the conductance of the transistor 336, $C_{gd336}$ is the gate-drain capacitance of the transistor 336, $g_{ds332}$ is the drain-source conductance of the transistor 332, $g_{ds336}$ is the drain-source conductance of the transistor 336, $C_{ds336}$ is the drain-source capacitance of the transistor 336, and $R_{322}$ is the resistance of the resistor 322.

The transfer functions $H_1(s)^-$ and $H_2(s)^-$ in the equations (7) and (8) can be given by equation (10) as follows:

$$H_1(s)^- = H_2(s)^- = \frac{V_O^-}{V_I^-} = gm_{332}R_0 \left( \frac{S - \frac{1}{gm_{332} * C_{gs332}}}{S + \frac{R_0}{C'_{s332}}} \right), \quad (10)$$

where $$R_0 \approx \frac{1}{g_{ds332}} // \left( \frac{1}{g_{ds336}} + R_{322} \right),$$

$C_{s332}' = C_{gs332} // C_{ds332}$, $gm_{332}$ is the conductance of the transistor 332, $C_{gs332}$ is the gate-source capacitance of the transistor 332, $g_{ds332}$ is the drain-source conductance of the transistor 332, $g_{ds336}$ is the drain-source conductance of the transistor 336, $C_{ds332}$ is the drain-source capacitance of the transistor 332, and $R_{322}$ is the resistance of the resistor 322.

Therefore, the transfer function H(s) of the buffer 233 can be given by equation (11) as follows:

$$H(s) = \frac{V_O^+ - V_O^-}{V_I^+ - V_I^-} \quad (11)$$

$$= H_1(s)^- - H_1(s)^+$$

$$= gm_{332}R_0 \left( \frac{S - \frac{1}{gm_{332} * C_{gs332}}}{S + \frac{R_0}{C'_{s332}}} \right) +$$

$$gm_{336}R_0 \left( \frac{S - \frac{1}{gm_{336} * C_{gd336}}}{S + \frac{R_0}{C'_{d336}}} \right).$$

Assume that $$a_n = \frac{1}{gm_n * C_{gdn}}, \quad b_n = \frac{R_0}{C'_{dn}}, \quad a'_n = \frac{1}{gm_n * C_{gsn}},$$

and $$b'_n = \frac{R_0}{C'_{sn}}.$$

Therefore, the amplitude |H(s)| of the transfer function H(s) can be given by equation (12) as follows:

$$|H(s)| \approx \left(gm_{332}R_0 * \frac{a'_{332}}{b'_{332}} + gm_{336}R_0 * \frac{a_{336}}{b_{336}}\right) = \left(\frac{C'_{s332}}{C_{gs332}} + \frac{C'_{d336}}{C_{gd336}}\right). \quad (12)$$

Thus, in one embodiment, if sizes of the transistors 332 and 336 are fixed, the amplitude |H(s)| of the transfer function H(s) of the buffer 233 is constant.

The phase θ of the transfer function H(s) can be given by equation (13) as follows:

$$\tan\theta \approx \frac{a'_{332} + b'_{332}}{a'_{332}b'_{332} - 1} + \frac{a_{336} + b_{336}}{a_{336}b_{336} - 1} \approx$$

$$gm_{332} * C_{gs332} + \frac{C'_{s332}}{R_0} + gm_{336} * C_{gd336} + \frac{C'_{d336}}{R_0}. \quad (13)$$

In one embodiment, the conductance $gm_{332}$ and the conductance $gm_{336}$ vary according to the current level I of the current source 310. Thus, $\tan\theta \propto \sqrt{I}$. In other words, the phase θ of the transfer function H(s) of the buffer 233 can be adjusted by adjusting the current level I of the current source 310.

If the detection circuit 220 detects that the phase of the in-phase channel is forward or backward to the phase of the quadrature-phase channel, the detection circuit 220 generates an alert signal PB0 or PB1. The controller 250 can generate the control signal 354 based on the alert signal PB0 or PB1. The control signal 354 controls the current source 310 to adjust the current level of the current source 310. If the phase of the in-phase channel is forward to the phase of the quadrature-phase channel, the current level of the current source 310 is decreased, in one embodiment. Thus, the phase θ of the transfer function H(s) of the buffer 233 is decreased. The phase of the signal 252 generated by the frequency mixer 232 is decreased as well. Therefore, the phase of the first signal 152 output by the in-phase channel is decreased. Consequently, the phase difference between the first signal 152 and the second signal 154 can be decreased, and thus the phase imbalance can be reduced or avoided.

In one embodiment, the control signal 354 for controlling the current source 310 is a multi-bit digital signal. Therefore, the current source 310 can generate different discrete current levels according to the status of the multi-bit digital signal. For example, the current source 310 can generate three different current levels if the control signal 354 is a three-bit digital signal. Therefore, the phase imbalance can be discretely adjusted. As a result, power consumption of the circuit 300 can be reduced.

Although the phase difference between the signals 152 and 154 is reduced using the buffer 233 in the example of FIG. 3, the invention is not so limited. By similar rationale, the buffer 235 in the receiver 230 can be used to reduce the phase difference between the signals 152 and 154. Advantageously, by using some existing components in the receiver 230 to adjust the phase difference, the overall cost can be reduced.

Yet in another embodiment, the controller 250 can generate two control signals in response to the alert signal from the detection circuit 220 to control the buffers 233 and 235 respectively. By controlling the buffers 233 and 235 simultaneously, both of the phases of the first signal 152 and the second signal 154 can be adjusted to reduce the phase difference between the first signal 152 and the second signal 154. Therefore, the adjusting capability and efficiency of the circuit 300 can be further improved.

Figure 4:
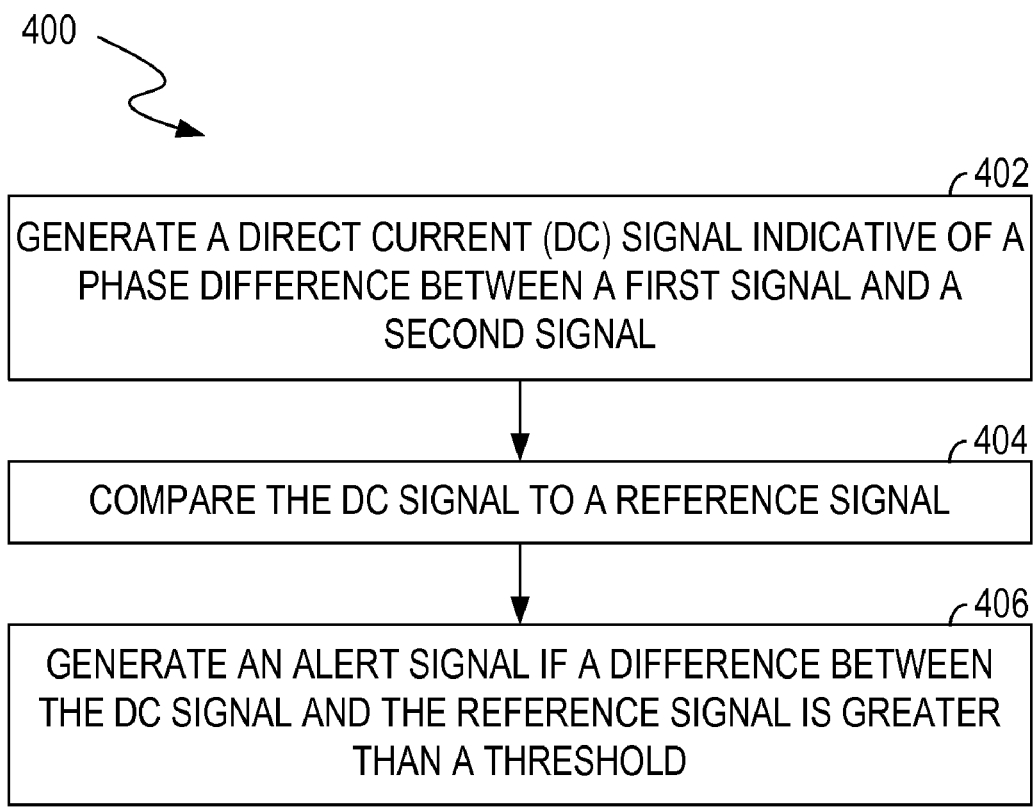
FIG. 4 shows a flowchart of a method for detecting a phase imbalance between a first signal and a second signal according to one embodiment of the present invention.

FIG. 4 shows a flowchart 400 of a method for detecting a phase imbalance between a first signal and a second signal according to one embodiment of the present invention. FIG. 4 is described in combination with FIG. 2.

In block 402, the DC signal 156 indicative of a phase difference between the first signal 152 and the second signal 154 is generated by the conversion block 120. In one embodiment, the phase difference between the signals 152 and 154 is determined by the phase difference between the in-phase channel and the quadrature-phase channel in the receiver 230.

In block 404, the DC signal 156 is compared to a reference signal by a comparator in the detection circuit 220. In one embodiment, the comparator 227 compares the DC signal 156 to the reference signal $V_{ref\_U}$ for determining if the phase of the first signal 152 is forward to the phase of the second signal 154. The comparator 228 compares the DC signal 156 to the reference signal $V_{ref\_L}$ for determining if the phase of the first signal 152 is backward to the phase of the second signal 154. The reference signal $V_{ref\_U}$ is greater than the reference signal $V_{ref\_L}$, in one embodiment.

In block 406, an alert signal is generated by the comparator in the detection circuit 220 if the difference between the DC signal 156 and the reference signal is greater than a predetermined threshold. In one embodiment, the detection circuit 220 can determine that the phase of the in-phase channel is forward to the phase of the quadrature-phase channel if the signal 156 is greater than a summation of the reference signal $V_{ref\_U}$ and a predeterimined threshold. Thus, the comparator 227 can generate the alert signal PB0 to indicate the phase imbalance. The detection circuit 220 can determine that the phase of the in-phase channel is backward to the phase of the quadrature-phase channel if the signal 156 is less than a summation of the reference signal $V_{ref\_L}$ and a predetermined threshold. Thus, the comparator 228 can generate the alert signal PB1 to indicate the phase imbalance. In one embodiment, the current level of a current source can be adjusted according to the alert signal to reduce the phase difference between the first signal 152 and the second signal 154 as described in FIG. 3. Thus, the phase imbalance between the first signal 152 and the second signal 154 can be reduced or eliminated.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for detecting a phase imbalance, said circuit comprising:
   a buffer receiving an oscillation signal and generating a frequency signal, wherein a phase of a transfer function of said buffer is determined by a current flowing through said buffer;
   a first channel, coupled to said buffer, that receives an input signal, that shifts a frequency of said input signal according to said frequency signal to generate a first output signal, wherein a phase of said first output signal is determined by said phase of said transfer function of said buffer;
   a second channel receiving said input signal and generating a second output signal;
   a conversion block generating a direct current (DC) signal based on said first output signal and said second output signal, wherein a level of said DC signal is determined by a phase difference between said first output signal and said second output signal;
   a first comparator coupled to said conversion block, said first comparator comparing said DC signal to a first reference signal and generating a first alert signal if a difference between said DC signal and said first reference signal is greater than a first predetermined threshold; and
   a controller coupled to said first comparator, said controller receiving said first alert signal and adjusting said current through said buffer to adjust the phase of said first output signal in response to said first alert signal.

2. The circuit of claim 1, wherein said first channel comprises an in-phase channel and said second channel comprises a quadrature-phase channel.

3. The circuit of claim 1, wherein said conversion block comprises:
   a frequency mixer receiving said first output signal and said second output signal and generating a third output signal that comprises said DC signal and a frequency signal, wherein a frequency of said frequency signal of said third output signal is a summation of a frequency of said first output signal and a frequency of said second output signal; and
   a filter coupled to said frequency mixer, said filter filtering said third output signal and providing said DC signal to said comparator.

4. The circuit of claim 1, wherein said first comparator generates said first alert signal if said DC signal is greater than a summation of said first reference signal and said first predetermined threshold.

5. The circuit of claim 1, wherein said circuit comprises a second comparator, and wherein said second comparator compares said DC signal to a second reference signal and generates a second alert signal if said DC signal is less than a summation of said second reference signal and a second predetermined threshold.

6. The circuit of claim 1, wherein said first output signal and said second output signal comprise demodulated radio frequency signals.

7. A method for detecting a phase imbalance, said method comprising:
   receiving an input signal;
   buffering an oscillation signal by a buffer to provide a frequency signal;
   shifting a frequency of said input signal according to said frequency signal to generate a first output signal;
   shifting a frequency of said input signal to generate a second output signal;
   generating a direct current (DC) signal indicative of a phase difference between said first output signal and said second output signal;
   comparing said DC signal to a reference signal;
   generating an alert signal if a difference between said DC signal and said reference signal is greater than a predetermined threshold;
   adjusting a current flowing through said buffer in response to said alert signal so as to adjust a phase of a transfer function of said buffer; and
   adjusting a phase of said first output signal according to said phase of said transfer function of said buffer.

8. The method of claim 7, further comprising:
   providing said first output signal by an in-phase channel; and
   providing said second output signal by a quadrature-phase channel.

9. A signal transfer system, comprising:
   a pair of buffers buffering an oscillation signal generated by an oscillator to provide a first frequency signal and a second frequency signal;
   a first channel receiving an input signal and shifting a frequency of said input signal according to said first frequency signal to generate a first output signal;
   a second channel receiving said input signal and shifting a frequency of said input signal according to said second frequency signal to generate a second output signal, wherein a phase difference between said first channel and said second channel is determined by a current flowing through said buffers;
   a detection circuit coupled to said first and said second channels, said direction circuit generating a direct current (DC) signal indicating a phase difference between said first signal and said second signal, and generating an alert signal by comparing a difference between said DC signal and a reference signal with a predetermined threshold; and
   a controller coupled to said detection circuit, said controller adjusting said current flowing through said buffers based on said alert signal to adjust said phase difference.

10. The signal transfer system of claim 9, wherein said current has discrete multiple levels.

11. The signal transfer system of claim 9, wherein said detection circuit comprises:
   a frequency mixer receiving said first output signal and said second output signal, said frequency mixer generating a third output signal that comprises said DC signal and a third frequency signal, wherein a frequency of said third frequency signal is a summation of a frequency of said first output signal and a frequency of said output second signal; and
   a filter coupled to said frequency mixer, said filter filtering said third output signal and providing said DC signal to said comparator.

12. The signal transfer system of claim 9, wherein said input signal comprises a radio frequency signal, and wherein said first channel and said second channels demodulate said input signal to said first output signal and said second output signal, respectively.

13. The signal transfer system of claim 9, wherein said first channel comprises an in-phase channel, and said second channel comprises a quadrature-phase channel.

* * * * *